(12) United States Patent
Shimizu et al.

(10) Patent No.: US 6,262,951 B1
(45) Date of Patent: Jul. 17, 2001

(54) INFORMATION REPRODUCING SYSTEM AND METHOD CAPABLE OF REPRODUCING IN DESIRED REPRODUCING TIME

(75) Inventors: Yuji Shimizu; Youngju Park; Takashi Irisawa; Jiro Endo; Hidehiro Ishii, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/271,987

(22) Filed: Mar. 19, 1999

(30) Foreign Application Priority Data

Mar. 20, 1998 (JP) .................................................. 10-072907

(51) Int. Cl.$^7$ ................................................... G11B 17/22
(52) U.S. Cl. ................................................... 369/33; 369/32
(58) Field of Search ............................... 369/33, 32, 47.1, 369/47.49, 44.28, 47.3

(56) References Cited

U.S. PATENT DOCUMENTS

| | | | |
|---|---|---|---|
| 5,126,987 | * 6/1992 | Shiba et al. | 369/32 |
| 5,216,644 | * 6/1993 | Shiba et al. | 369/32 |
| 5,363,264 | * 11/1994 | Cavanaugh et al. | 386/110 |
| 5,363,354 | * 11/1994 | Tabuchi | 369/32 |
| 5,408,448 | * 4/1995 | Carman | 369/32 |
| 5,408,449 | * 4/1995 | Oh | 369/32 |
| 5,457,669 | * 10/1995 | Kim et al. | 369/32 |
| 5,504,585 | * 4/1996 | Fujinami et al. | 386/111 |
| 5,774,441 | * 6/1998 | Nakagawa | 369/59 |

* cited by examiner

Primary Examiner—Tan Dinh
(74) Attorney, Agent, or Firm—Morgan, Lewis & Bockius LLP

(57) ABSTRACT

An arbitrary desired reproducing time is set for reproducing information recorded on a recording medium, and an ordinary reproducing time is obtained based on management information recorded on the recording medium when the recorded information is reproduced at a standard reproducing speed. A skipping rate is calculated from the desired reproducing time and the ordinary reproducing time. A reproducing device is provided for reproducing the information recorded on the recording medium in the set desired reproducing time at the calculated skipping rate.

6 Claims, 3 Drawing Sheets

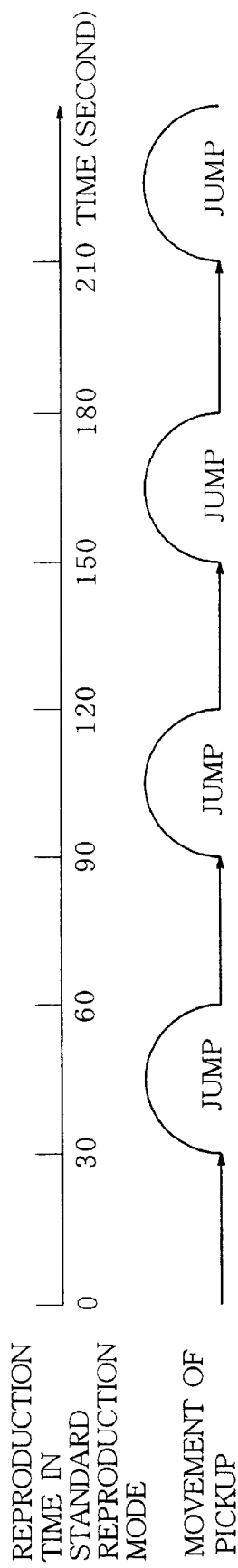

INFORMATION REPRODUCING SYSTEM AND METHOD CAPABLE OF REPRODUCING IN DESIRED REPRODUCING TIME

BACKGROUND OF THE INVENTION

The present invention relates to an information reproducing system.

As a system for reproducing information such as a moving picture recorded on an optical disc, VTR, DVTR, DVD and others are known.

There has been known a reproducing system in which the speed for reproducing recorded information can be increased to a predetermined speed, for example 2-fold speed or 3-fold speed, thereby shortening time for watching the reproduced picture.

However, the reproducing speed can not be arbitrarily set in order to watch the picture within a desired time.

SUMMARY OF THE INVENTION

An object of the present invention is to provide an information reproducing system which is possible to increase the reproducing speed to an arbitrary speed.

According to the present invention, there is provided an information reproducing system comprising, setting means for setting an arbitrary desired reproducing time for reproducing information recorded on a recording medium, means for obtaining an ordinary reproducing time based on management information recorded on the recording medium when the recorded information is reproduced at a standard reproducing speed, calculating means for calculating a skipping rate from the desired reproducing time and the ordinary reproducing time, preparing means for preparing a reproduction address map from the skipping rate, reproducing means for reproducing the information recorded on the recording medium in the set desired reproducing time at the calculated skipping rate.

The system further comprises instructing means for instructing skipping of information during the reproduction, means responsive to the instruction by the instructing means for skipping the information after the instruction for a predetermined time, and means for updating the reproduction address map at the timing of the skipping of the information.

These and other objects and features of the present invention will become more apparent from the following detailed description with reference to the accompanying drawings.

BRIEF DESCRIPTION OF DRAWINGS

FIG. 3 is a graph showing the operation of a pickup.

DETAILED DESCRIPTION OF THE PREFERRED EMBODIMENT

Figure 1:
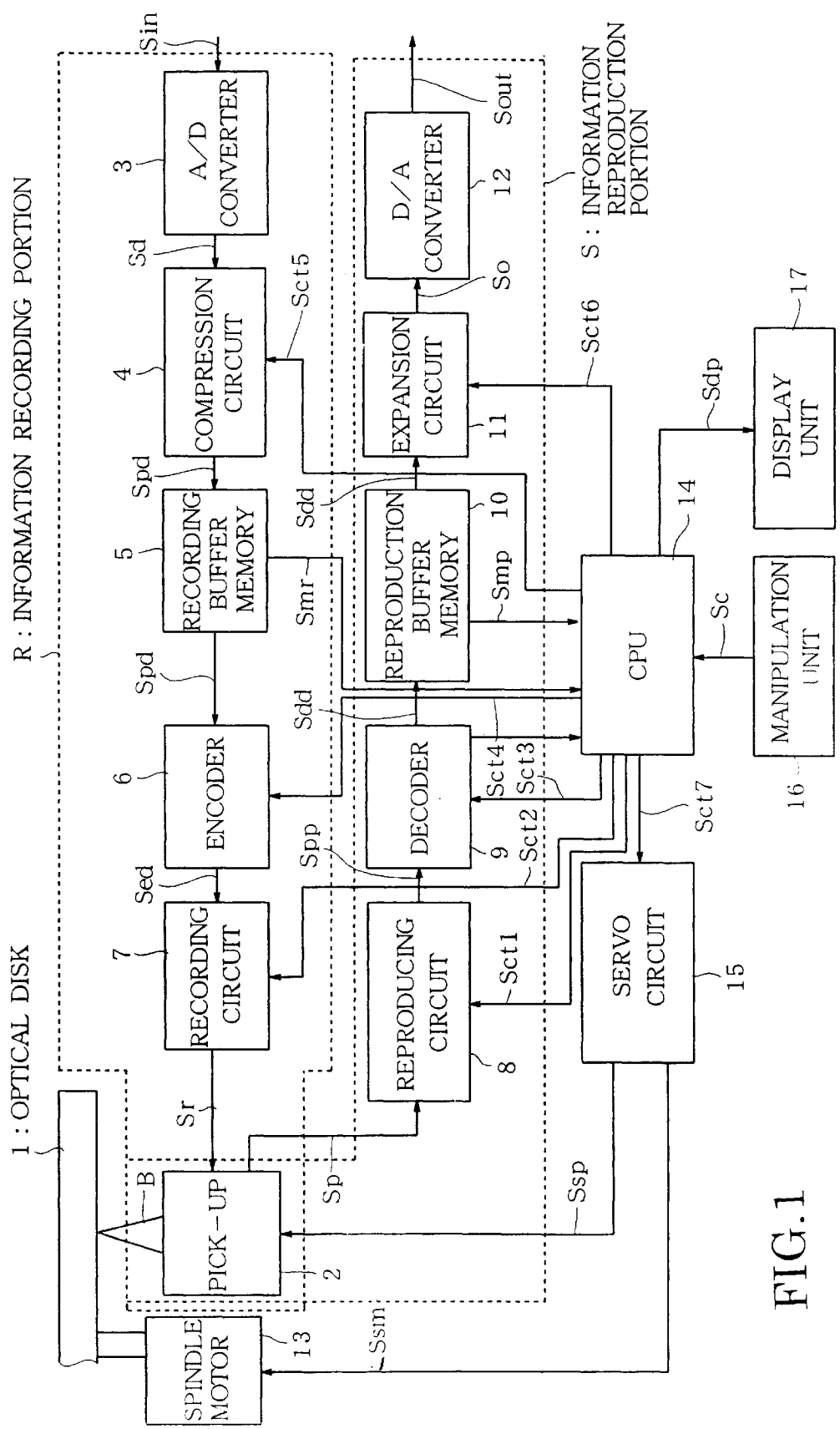
FIG. 1 is a block diagram showing an information recording and reproducing system to which the present invention is applied.

Referring to FIG. 1, the constitution of an information recording and reproducing system will be described.

As shown in FIG. 1, the information recording and reproducing system consists of a pick-up 2 serving as recording and detecting means, an A/D converter 3, a compression circuit 4 serving as processing means, a recording buffer memory serving as recording information storage means, an encoder 6, a recording circuit 7, a reproducing circuit 8, a decoder 9, a reproduction buffer memory 10 serving as storage means, an expansion circuit 11 serving as reprocessing means, a D/A converter 12, a spindle motor 13, a CPU 14 serving as control means, a servo circuit 15, a manipulation unit 16 and a display unit 17.

In those constituent elements, the pick-up 2, A/D converter 3, compression circuit 4, recording buffer memory 5, encoder 6 and recording circuit 7 constitute an information recording part R serving as information recording means.

The pick-up 2, reproduction circuit 8, decoder 9, reproduction buffer memory 10, expansion circuit 11 and D/A converter 12 constitute an information reproduction part P serving as information reproducing means.

The operation of the information recording and reproducing system with the above-stated constitution will be outlined.

First, description will be given to the optical disc 1 serving as a recording medium for recording external information to be recorded on the optical disc 1.

A user manipulates the manipulation unit 16. When an information signal $S_{in}$ (analog signal) corresponding to the information to be recorded externally (which includes image information and/or audio information) is inputted, the A/D converter 3 digitizes the information signal $S_{in}$ to generate a digital information signal $S_d$ of preset input rate Mr and outputs the signal $S_d$ to the compression circuit 4.

The compression circuit 4 compresses the inputted digital information signal $S_d$ based on a control signal $S_{ct5}$ fed from the CPU 14, generates a compressed information signal $S_{pd}$ and applies the signal $S_{pd}$ to the recording buffer memory 5. In the compressing of the digital information signal $S_d$, a compression system such as a MPEG2 (Moving Picture coding Expert Group 2) system is used if the digital information signal $S_d$ is a moving picture.

The recording buffer memory 5 temporarily stores the inputted compressed information signal $S_{pd}$. At that time, the recording buffer memory 5 applies a data quantity signal $S_{mr}$ indicating the quantity of data of the stored compressed information signal $S_{pd}$ to the CPU 14.

Thereafter, the encoder 6 encodes the compressed information signal $S_{pd}$ read from the recording buffer memory 5 at a higher recording rate $R_r$ than the input rate Mr of the digital information signal $S_d$ based on a control signal $S_{ct4}$ fed from the CPU 14, and feeds an encoded signal $S_{ed}$ to the recording circuit 7.

The recording circuit 7 converts the inputted encoded signal $S_{ed}$ into a recording signal $S_r$ based on a control signal $S_{ct2}$ fed from the CPU 14 and supplies the recording signal $S_r$ to the pick-up 2. At th at time, the recording circuit 7 performs so-called write strategy processing to the encoded signal $S_{ed}$ to form Pits shaped accurately conforming to the information to be recorded on the optical disc 1 which will be described later.

The pick-up 2 drives a light source such as a semiconductor laser (not shown) provided therein based on the recording signal $S_r$ fed from the recording circuit 7, applies a light beam B such as a laser beam onto the information recording surface of the optical disc 1, and records the information signal $S_{in}$ on the optical disc at a rate corresponding to the above-stated recording rate $R_r$. The optical disc 1 is rotated at a predetermined rotation rate by the spindle motor 13 driven on the basis of a spindle control signal $S_{sm}$ as described later. It is noted that a pit corresponding to the recording signal $S_r$ is formed by means of phase change system on the optical disc 1.

The operation for reproducing the information recorded on the optical disc 1 will be described.

In reproduction, the pick-up 2 applies a light beam B for reproduction onto the rotating optical disc 1, generates a detecting signal $S_p$ corresponding to the pit formed on the optical disc 1 at a detecting rate $R_p$ based on a reflected light, and feeds the detecting signal $S_p$ to the reproducing circuit 8.

The reproducing circuit 8 amplifies the detecting signal $S_p$ at a predetermined amplification rate based on a control signal $S_{ct1}$ fed from the CPU 14, rectifies the waveform of the signal $S_p$, and supplies a reproduction signal $S_{pp}$ to the decoder 9.

The decoder 9 decodes the reproduction signal $S_{pp}$ by means of a decoding system corresponding to the encoding system as in the encoder 6 based on a control signal $S_{ct3}$ fed from the CPU 14, generates a decoded signal $S_{dd}$ and feeds the signal $S_{dd}$ to the reproduction buffer memory 10 at a rate corresponding to the detection rate $R_p$.

The reproduction buffer memory 10 temporarily stores the decoded signal $S_{dd}$. During the storing, the reproduction buffer memory 10 supplies a data quantity signal $S_{mp}$ indicating the quantity of data of the decoded signal $S_{dd}$ to the CPU 14.

The expansion circuit 11 reads the decoded signal $S_{dd}$ stored in the reproduction buffer memory at a low output rate $M_p$ equal to or lower than the detection rate $R_p$ of the detection signal $S_p$ based on a control signal $S_{ct6}$ from the CPU 14. The expansion circuit 11 conducts expansion processing, corresponding to the compression processing in the compression circuit 4, to the decoded signal $S_{dd}$, and feeds an expanded signal $S_o$ to the D/A converter 12.

The D/A converter 12 converts the expanded signal $S_o$ to an analog signal, and supplies an output signal $S_{out}$ corresponding to the information signal $S_{in}$ to the outside.

On the other hand, the CPU 14 feeds a control signal $S_{ct7}$ for servo-controlling the spindle motor 13 and the pick-up 2 to the servo circuit 15. The servo circuit 15 feeds the spindle control signal $S_{sm}$ for controlling the rotation of the spindle motor 13 based on the control signal $S_{ct7}$ to the spindle motor 13. The servo circuit 15 also feeds a pick-up control signal $S_{sp}$ for focus-servo control to the pick-up 2. While conducting tracking servo control and focus servo control to the light beam B based on the pick-up control signal $S_{sp}$, the pick-up 2 records the recording signal $S_r$ (information signal $S_{in}$) or detects the detection signal $S_p$. Besides, information necessary for the user to control the operation of the information recording and reproducing system is displayed on the display unit 17 based on a display signal $S_{dp}$ from the CPU 14.

Figure 2:
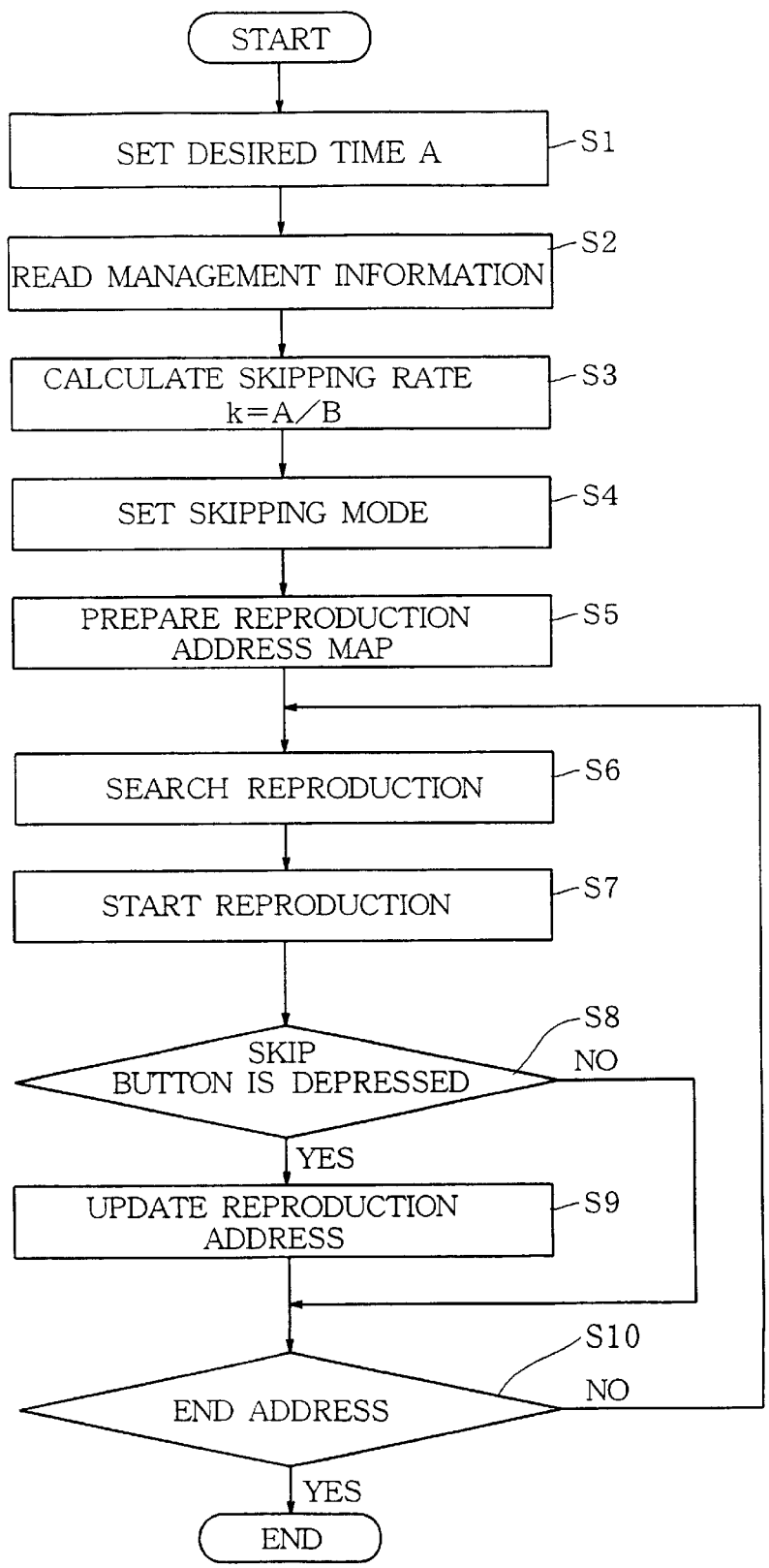
FIG. 2 is a flow chart showing information reproducing operation.

Description will now be given to the operation of the system of the present invention with respect to FIG. 2.

A user sets desired time A, in which time the user can watch, for example a complete TV program, in the CPU 14 through the manipulation unit 16, at a step S1. At a step S2, management information such as recording start address of the TV program recorded on the disc, recording end address and concentration information are read out from a predetermined region of the disc 1.

In this embodiment, the concentrated information is provided as a recording position (or address) on the optical disc 1 on which corresponding information, for example, per second when converting recorded information into reproduction time thereof (which is passage time if the recorded information is reproduced at a standard rate).

In this embodiment, the compressed information signal is generated by means of, for example, the MPEG2 compression system. Using such ordinary compression system, differential information with a previous image plane is recorded as information data and the quantity of data, therefore, varies with the information (or a picture) to be recorded. For instance, if the recorded information is a static image, the differential information with the previous image planes is zero over one frame (one image plane). In case of scene changing information, differential information is generated over one frame. Thus, the quantity of actually recorded data varies with the information to be recorded. Even if different pieces of information are converted to the same reproduction time of one second, they differ in the quantity of data actually reproduced from the optical disc 1. In other words, unlike an optical disc, such as a laser disc, on which analog information is recorded, the addresses and reproduction time for the recorded information do not satisfy linear relationship between them in the optical disc. That is the concentrated information is required to associate the actually recorded information with reproduction time.

The CPU 14 calculates a time B necessary for watching the TV program at a standard reproducing speed based on the management information read out at the step S2.

The CPU 14 calculates a skipping rate K necessary for watching the TV program within the desired time A from the following formula at a step S3.

$$K=A/B$$

The CPU sets a skipping reproduction mode at a step S4. The skipping reproduction mode instructs a skipping manner. For example, if the skipping rate is set to 0.5 and a standard time is set to 60 seconds, the system reproduces for 30 seconds and skips the program for 30 seconds as shown in FIG. 3.

In the case of the video signal of NTSC television system, since there is 30 frames per 1 second, 15 frames are reproduced and 15 frames are skipped.

Next, the CPU prepares a reproduction address map necessary for the skip reproduction based on the concentrated information (step S5). In the address map, a reproduction start address and an end address are stored.

At a step S6, the address for reproducing the information is searched, and the reproduction starts at a step S7.

At a step S8, it is determined whether a skip button provided on the manipulation unit 16 is depressed by the user. The skip button is provided for skipping an undesirable picture such as commercial picture for the user.

If the skip is not instructed, the ordinary skipping reproduction is performed. At a step S10, when the end address is determined, the program ends.

If the skip is instructed, information for a set time, for example 60 seconds, is skipped. At a step S9, the reproduction address map is corrected by the address corresponding to the information for 60 seconds based on the skip reproduction mode set at the step S4. Thereafter, the program proceeds to the step S10 and ends in accordance with the determination at the step S10.

In the above described program, when the skip button is depressed, the skipping for 60 seconds is carried out. However, it is possible to increase the period of the skipping. For example, when the push button is depressed two times, information for 120 seconds is skipped, and the reproduction address map is updated based on the information after 120 seconds.

Although the system for reproducing the optical disc is described, the present invention can be applied to other recording mediums, for example a semiconductor memory.

In accordance with the present invention, it is possible to watch entire information within a desired time by arbitrarily increasing the reproduction speed based on the set desired time.

While the invention has been described in conjunction with preferred specific embodiment thereof, it will be understood that this description is intended to illustrate and not limit the scope of the invention, which is defined by the following claims.

What is claimed is:

1. An information reproducing system comprising:

setting means for setting an arbitrary desired reproducing period of time for reproducing information recorded on a recording medium;

means for obtaining an ordinary reproducing period of time based on management information recorded on the recording medium when the recorded information is reproduced at a standard reproducing speed;

calculating means for calculating a skipping rate from the desired reproducing time and the ordinary reproducing time;

preparing means for preparing a reproduction address map from the skipping rate; and reproducing means for reproducing the information recorded on the recording medium in the set desired reproducing time at the calculated skipping rate.

2. The system according to claim 1 further comprising instructing means for instructing skipping of information during the reproduction, means responsive to the instruction by the instructing means for skipping the information after the instruction for a predetermined time, and means for updating the reproduction address map at the timing of the skipping of the information.

3. The system according to claim 2 wherein the predetermined time is increased with the number of repetitions of the instruction.

4. An information reproducing method for reproducing information in a desired reproducing time, comprising:

setting an arbitrary desired reproducing period of time for reproducing information recorded on a recording medium;

obtaining an ordinary reproducing period of time based on management information recorded on the recording medium when the recorded information is reproduced at a standard reproducing speed;

calculating a skipping rate from the desired reproducing time and the ordinary reproducing time;

preparing a reproduction address map from the skipping rate; and reproducing the information recorded on the recording medium in the set desired reproducing time at the calculated skipping rate.

5. An information reproducing method as claimed in claim 4, further comprising:

instructing skipping of information during the reproduction;

skipping the information for a predetermined time in response to the instruction; and updating the reproduction address map at the timing of the skipping of the information.

6. An information reproducing method as claimed in claim 5, wherein said predetermined time is increased with the number of repetitions of the instruction.

* * * * *